United States Patent [19]

Okada et al.

[11] 4,238,777
[45] Dec. 9, 1980

[54] DROP-OUT DETECTING SYSTEM FOR VIDEO RECORDING MAGNETIC TAPE

[75] Inventors: Akira Okada, Komoro; Yoshio Mikame; Ryoiti Aizawa, both of Saku, all of Japan

[73] Assignee: TDK Electronics Company Limited, Tokyo, Japan

[21] Appl. No.: 68,545

[22] Filed: Aug. 22, 1979

[30] Foreign Application Priority Data

Aug. 31, 1978 [JP] Japan ................... 53-107055

[51] Int. Cl.³ ............................................. H04N 5/78
[52] U.S. Cl. .................................................... 360/38
[58] Field of Search ................................... 360/38, 33

[56] References Cited

U.S. PATENT DOCUMENTS 3,573,359  4/1971  Guisinger ..................... 360/38

FOREIGN PATENT DOCUMENTS 2413318  10/1975  Fed. Rep. of Germany ............ 360/38

*Primary Examiner*—Raymond F. Cardillo, Jr.
*Assistant Examiner*—Aristotelis M. Psitos
*Attorney, Agent, or Firm*—Martin Novack

[57] ABSTRACT

A drop-out on an oblique video channel of a video recording magnetic tape is recognized by marking a signal on the voice channel relating to that drop-out. The marking signal on the voice channel is positioned on the line perpendicular to the moving direction of the tape, and the drop-out resides on said line. After developing the tape thus marked, the mark is first visually recognized, and the corresponding drop-out is detected also visually on said line. The apparatus for marking on the voice channel corresponding a drop-out comprises of a tape running means having at least a helical scan head for reading the signal recorded magnetically on an oblique video channel of the tape to be tested, and a voice channel head positioned apart from said helical scan head along the path of the tape; a drop-out detector connected to the output of said helical scan head of the tape running means; a drop-out position detector consisting of a counter, which is initiated by the head element switching signal of said helical scan head from said tape running means, and said counter being decremented or incremented by the predetermined pulse train for providing the position (k) of the drop-out on an oblique video channel, a delay calculator for providing the marking signal after the time $C_1 k + C_2$ (where $C_1$ and $C_2$ are constants) elapses from the detection of the drop-out by said drop-out detector; and means for providing a marking signal to said voice channel head of said tape running means upon receipt of said marking signal from the delay calculator.

8 Claims, 7 Drawing Figures

DROP-OUT DETECTING SYSTEM FOR VIDEO RECORDING MAGNETIC TAPE

BACKGROUND OF THE INVENTION

The present invention relates to a drop-out recording system of a video recording magnetic tape, in particular, it relates to such a system which records the voice channel signal on a voice channel of said magnetic tape depending upon the drop-out in a video channel. The present drop-out recording system can be utilized for the laboratory analysis of a drop-out of a magnetic tape in order to provide an improved magnetic tape.

A drop-out or a defect on a video recording magnetic tape deteriorates the picture quality of a reproduced image, therefore, we must detect the drop-out on a magnetic tape, and analyze the reason why said drop-out occurred on a magnetic tape in order to provide the improved picture quality and/or a drop-out free magnetic tape.

A drop-out of a video recording magnetic tape is defined by having the signal level of the particular portion on the tape lower than the normal level for instance by more than 18 dB, and the duration of that low level is more than one half of the scanning time. Since the scanning time of each scanning line in a present television standard system is approximate 63 μS, said duration corresponds to approximate 20 μm of length when the relative speed of a tape to a magnetic head is 6 meter/second. According to some specifications for the purchasing of a video recording magnetic tape, the number of drop-outs in one minute must be less than 30.

A drop-out on a magnetic tape results from dust on a tape, the injury of the plastic base material, and/or a lump of magnetic material on a tape. By analyzing the drop-outs statistically, the information for improving a magnetic tape in the manufacturing process is obtained.

It should be noted that there are many defects on a magnetic tape, some are big defects that give large deterioration of the picture quality, and some are small defects which give little deterioration of a picture quality. Therefore, for laboratory analysis purposes, a defect which gives the substantial deterioration of the picture quality having the level less than −18 dB, and the duration longer than one half of a scanning line must be selected from all the defects, and that substantial defect must be analyzed for improving the quality of a magnetic tape in the manufacturing process of said tape.

According to one of the prior drop-out detecting systems, a magnetic tape to be tested is developed magnetically by utilizing the particular reagent including ferro-magnetic material which is for instance powdered carbonyl iron contained in a liquid. After developing a magnetic tape magnetically, powder of ferro-magnetic material is attached on the surface of a magnetic tape, but said powder does not attach on the drop-out portion. Accordingly, a drop-out can be detected visually. However, this chemical method for detecting a drop-out has the disadvantage that it does not enable us to select the substantial drop-out which gives the level lower than −18 dB and the duration longer than one half of a scanning line. This is to say, although we can recognize a drop-out visually, we can not determine the grade of the picture deterioration by the recognized drop-out.

According to another prior drop-out detecting system, a drop-out is detected electrically by running the magnetic tape to be testd along a magnetic head, which reads the electrical signal recorded on the tape. If the reproduced electrical signal is interrupted for a predetermined duration, the drop-out is then recognized. However, this electrical system of drop-out detection has the disadvantage that we can not determine which position on a magnetic tape provides the electrically detected drop-out.

According to one proposal for overcoming the disadvantages of the prior arts, the magnetic tape to be tested runs along a magnetic head, and when a drop-out is electrically detected, an erasing current is provided to a magnetic head which erases the records on a tape just after a drop-out. Thus, a large artificial drop-out is provided just after the actual drop-out. Next, by developing magnetically the tape using a reagent, both the artificial drop-out and the actual drop-out appear visually. The actual drop-out is recognized since it is just after the large artificial drop-out. However, that proposal has the disadvantage that a strong erasing current must be provided on a magnetic head during the read operation of said magnetic head. Therefore, one must change some circuit around a magnetic head of a video tape recorder just for the test purpose for a drop-out. This change accounts for a high cost of testing.

SUMMARY OF THE INVENTION

It is an object, therefore, of the present invention to overcome the disadvantages and limitations of the prior drop-out detecting systems, by providing a new and improved drop-out detecting system for video recording magnetic tapes.

It is also an object of the present invention to provide a drop-out detecting system in which a visual detection coincides completely with an electrical detection by utilizing an ordinary video tape recorder.

The above and other objects are attained by a drop-out detecting system for video recording magnetic tapes comprising of a tape running means having at least a helical scan head for reading the signal recorded magnetically on an oblique video channel of the tape to be tested, and a voice channel head positioned apart from said helical scan head along the path of the tape; a drop-out detector connected to the output of said helical scan head of the tape running means; a drop-out position detector consisting of a counter, which is initiated by the head element switching signal of said helical scan head from said tape running means, and said counter being decremented or incremented by the predetermined pulse train for providing the position (k) of the drop-out on an oblique video channel; a delay calculator for providing the marking signal after the time $C_1 k + C_2$, where $C_1$ and $C_2$ are constants, elapses from the detection of the drop-out by said drop-out detector; and means for providing a recording signal to said voice channel head of said tape running means upon receipt of said marking signal from the delay calculator.

BRIEF DESCRIPTION OF THE DRAWINGS

The preceding objects, features, and attendant advantages of the present invention become better understood by means of the following description and accompanying drawings wherein.

DESCRIPTION OF THE PREFERRED EMBODIMENTS

The principle concept of the present invention is as follows.

(1) An ordinary video tape recorder is utilized without the change of any circuits.

(2) When a drop-out on a video channel is detected, a signal is recorded on a voice channel corresponding to the drop-out. Preferably, the voice channel signal is recorded just below the drop-out. That is to say, the drop-out on a video channel and the corresponding voice channel signal are on the straight line lateral to the moving direction of a tape.

(3) After recording the voice channel signal, the tape is developed using an reagent with ferro-magnetic material, and when the voice channel signal appears visually, the image just above that voice channel signal on a video channel is recognized as a substantial drop-out. Accordingly, a drop-out thus recognized is analyzed, and the result of the analysis is utilized for the improvement of tape quality and the manufacturing process of a tape.

Figure 1:
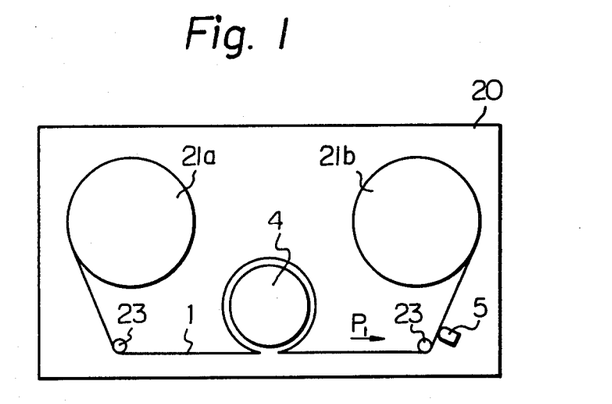
FIG. 1 shows the arrangement of the tape deck of a video tape recorder utilized in the present invention.

FIG. 1 shows the arrangement of a tape deck of a video tape recorder, in which the reference numeral 20 represents the tape deck, 21a and 21b are tape reels for winding-up or taking-off a tape, 23 is a tape guide, 1 is a tape running in the direction as indicated by the arrow $P_1$ from the first reel 21a to the second reel 21b, 4 is a helical scan head, and 5 is a voice channel head. A tape runs around the helical scan head 4 which scans the tape along an oblique line on the tape, and said tape runs along the voice channel head 5 after passing said helical scan head 4. It is assumed that a tape to be tested is recorded by an FM (frequency modulation) modulated three level signal corresponding to white, gray and black levels on video channels, so that one third of the left side of a screen is white, the middle one third is gray, and the right one third is black, and no signal is recorded on a voice channel beforehand.

Figure 2:
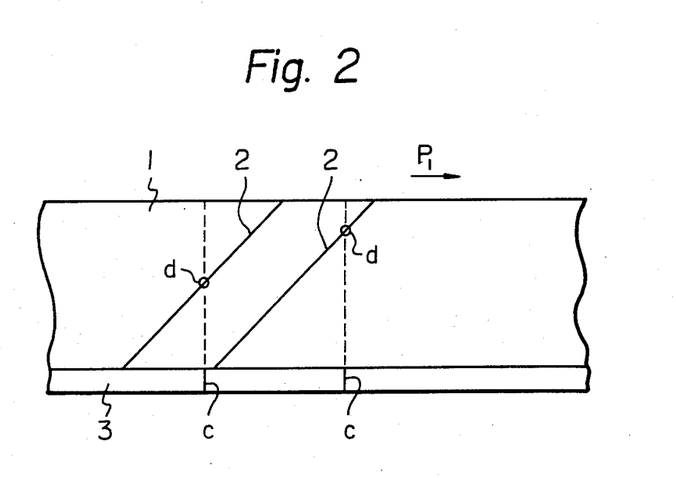
FIG. 2 shows the format of a magnetic tape having a drop-out and the corresponding drop-out marker according to present invention.

FIG. 2 shows the format of a magnetic tape having a drop-out and the corresponding drop-out marker recorded on a voice channel. In FIG. 2, the reference numeral 1 represents tape to be tested, 2 is a video channel, and 3 is a voice channel. The symbol (d) is a drop-out recognized on a video channel 2, and the symbol (C) is a drop-out marker recorded on the voice channel 3. It should be understood that both the drop-out (d) and the marker (C) reside on the dotted line which is perpendicular to the moving direction $P_1$ of a tape. Therefore, after developing the tape, a drop-out (d) can be easily recognized by finding a marker (C).

It should be noted in FIG. 1 and FIG. 2, that the voice channel head 5 is positioned apart from the helical scan head 4 which detects a drop-out. Therefore, in order to attain the relationship of FIG. 2 between a drop-out and a marker, the drop-out information detected by a helical scan head 4 is retained for some time corresponding to the tape moving speed and the position of a drop-out on a video channel, and said information thus delayed is recorded on a voice channel when the drop-out portion runs just in front of the voice channel head 5. The above relationship will be explained in accordance with FIG. 3.

Figure 3:
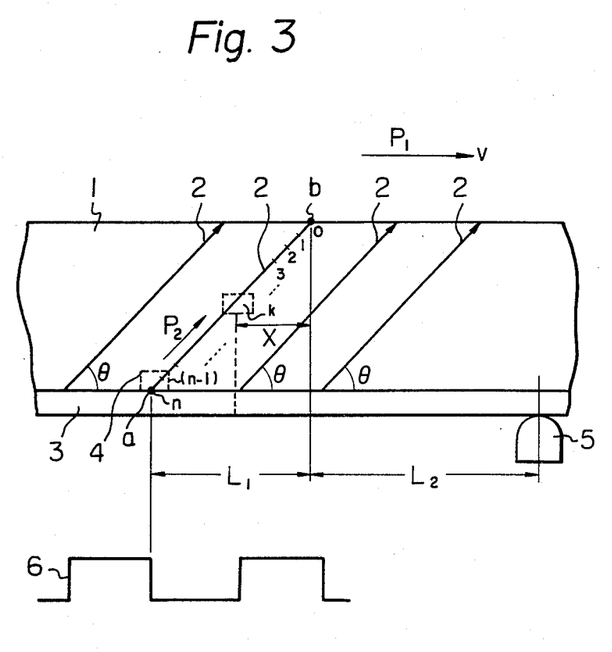
FIG. 3 is an explanatory drawing of the video scanning channel utilizing a helical-scanning head and the voice channel.

In FIG. 3, the reference numeral 1 is a magnetic tape which runs in the $P_1$ direction with the moving speed (v), 2 is a video channel which is positioned oblique to the longitudinal direction of a tape 1. 3 is a voice channel which runs along the extreme end side of a tape 1 and runs parallel to the longitudinal direction of a tape 1. 4 is a video head which is a helical scan head, and said head 4 has usually two head elements which are mounted at both ends of the diameter of the axis of the helical scan head. Said two head elements operate alternately by switching the same by a head switching signal 6. The video head 4 scans the tape 1 along the video channel 2 in the $P_2$ direction. 5 is a voice channel head which is positioned along the path of the voice channel 3, and 6 is said head switching signal for switching the video head elements.

$L_1$ is the length of the projection of each video channel 2 in the moving direction, and $L_2$ is the length between the end (b) of the video channel 2 and the voice channel head 5. Assuming that a video channel 2 from the starting point (a) to the end point (b) is divided to n portions (n is a positive integer), each of which has the same length as one another. Each divided portion is numbered as 0, 1, 2, 3, ....., n from the point (b). In this case, the length (X) which is the projection of the line b-k between the end point (b) and the k'th divided portion (k) is represented by:

$$X = \frac{L_1}{n} \cdot k$$

Since the moving speed of the tape 1 in the $P_1$ direction is (v), the time $t_1$ which is the time that the k'th divided portion (k) reaches the end point (b) is expressed as follows.

$$t_1 = \frac{X}{v} = \frac{L_1}{n \cdot v} \cdot k$$

Also, the time $t_2$ that the point (b) reaches the voice channel head 5 is expressed by $t_2 = L_2/v$ Accordingly, the time t that the portion (k) on a video channel 2 reaches the voice channel head 5 is expressed as follows.

$$t = t_1 + t_2 = \frac{L_1}{n \cdot v} \cdot k + \frac{L_2}{v} \tag{1}$$

It should be understood in the above formula (1) that the symbols $L_1$, $L_2$, v, are constants defined by the structure of the deck of the video tape recorder, and also the symbol n is the constant. Accordingly, if $C_1 = L_1/(n \cdot v)$ and $C_2 = L_2/v$ are introduced, the formula (1) can be expressed as follows.

$$t = C_1 \cdot k + C_2 \tag{2}$$

where $C_1$ and $C_2$ are seen to be velocity related constants Accordingly, when a drop-out is detected at the k'th divided portion on a video channel, we have only to write a marking signal on the voice channel after the time (t) defined by the formula (2) has elapsed, and the relationship between the drop-out and the marking signal as shown in FIG. 2 is obtained.

In a practical embodiment, for instance in the VHS standard system, the length $L_1$ is 96.142 mm, the length $L_2$ is 79.244 mm, the angle $\theta$ is 5°58′9.9″, and the tapes moving speed is v=33.35 mm/second. Accordingly, the formula (2) is expressed as follows.

$$t(second) = 2.883 \ k/n + 2.376 \qquad (2')$$

where n is the number of divided portions of each video channel.

Figure 4:
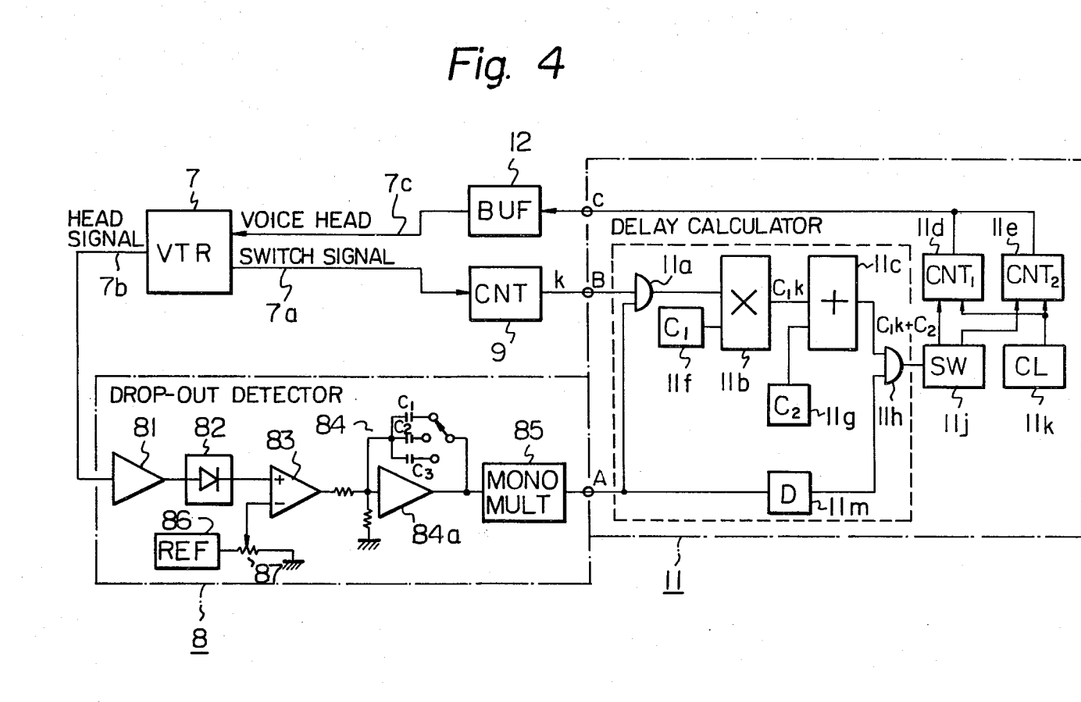
FIG. 4 is the block-diagram of the drop-out marker recording system according to the present invention.

FIG. 4 shows the block diagram of the drop-out marker recording system according to the present invention. In FIG. 4, the reference numeral 7 is a video tape recorder, 8 is a drop-out detector, 9 is a drop-out position detector which provides the value (k). That detector 9 is implemented by a down-counter which sets the value (n) by the head switching signal 6 when the head element passes the point (a) in FIG. 3, and the content of said counter 9 is decreased one by one every time the predetermined clock pulse is provided. Of course said counter is designed so that the content of the counter 9 reaches zero when the head element reaches the other point (b). The counter 9 has for instance four bit positions, and in this case, the number n of the divided portions of a video channel in $n = 2^4 = 16$, and 16 clock pulses are provided to the counter 9 to subtract the same during each scanning time.

It is apparent to those skilled in the art that the counter 9 thus composed can provide the value (k) of the formula (2) or (2') by the instantaneous content of the same when a drop-out is detected.

The drop-out detector 8 receives the output signal from the helical scan head of the video tape recorder, and it is assumed that said output signal is the sum of two outputs of two head elements. Said output signal which is the FM modulated video signal is applied to one input of the comparator 83 through the line 7b, the buffer amplifier 81 and the rectifier 82. The other input of said comparator 83 receives the signal from the reference voltage source 86 through the potentiometer 87. When the first input signal is lower than the second input signal, then, the comparator 83 provides an output signal. The potentiometer 87 is adjusted so that the comparator 83 provides the output signal when the level of the head output signal from the video tape recorder decreases by the predetermined level, which is for instance $-18$ dB. The output signal of said comparator is applied to the input of the integrator 84, the time constant of which is adjusted by switching the capacitors $C_1$, $C_2$ and $C_3$. Since the output of the comparator 83 is processed in the integrator 84, a thin drop-out shorter than the time constant of the integrator 84 does not appear at the output of the integrator 84, and those drop-outs having a long enough time duration, appear at the output of the integrator 84. The time constant of the integrator 84 is adjusted by switching the capacitors $C_1$ through $C_3$ so that when the drop-out is longer than the predetermined time, (for instance, longer than one half of a scanning line) the output signal is provided. The output of the integrator 84 is waveshaped by the monostable multivibrator 85, the output of which is applied to the delay calculator 11.

The delay calculator 11 calculates the time (t) of the formula (2) or (2′) depending upon the variable (k) provided from the counter 9 through the terminal (B), and when the time (t) elapses the output signal is provided at the terminal (C). The value (k) from the counter 9 is applied to one input of the multiplier 11b through the AND circuit 11a, which opens when the drop-out detector 8 recognizes a drop-out on a magnetic tape. The other input of said multiplier 11b receives the reference value ($C_1$) from the first reference source 11f the content of which is for instance 2.883/n=0.18 (when n=16). Therefore, the product $C_1 \cdot k$ is obtained at the output of said multiplier 11b. Said product $C_1 \cdot k$ is applied to one input of the adder 11c, the other input which receives the reference value $C_2$ from the second reference source the content of which is for instance $C_2 = 2.376$. Therefore, the adder 11c provides the sum of $C_1 k + C_2$. It is assumed that the delay circuit 11m delays the input signal by the time equal to the sum of the multiplication time in the multiplier 11b and the addition time in the adder 11c. Therefore, the delay circuit 11m provides the output signal just when the adder provides the sum at the output of the same, and said delay output signal opens the AND circuit 11h. Thus, the sum of the adder 11c is applied to either the first time counter 11d, or the second time counter 11e through said AND circuit 11h and the switch 11j. The switch 11j connects the output of the AND circuit 11h to the first time counter 11d whenever said first time counter is empty, but switches the output of the AND circuit 11h to the second time counter 11e when the first time counter 11d is not empty. The content of these counters are decreased one by one by a clock pulse from the clock pulse generator 11k. The period of the clock pulse is for instance 1 millisecond. When the content of the time counter 11d or 11e reaches zero, an output signal is provided at the output of the counter 11d or 11e, and said output signal is applied to the voice channel head of the video tape recorder 7 through the terminal (c) of the delay calculator 11, the buffer amplifier 12 and the line 7c. The buffer amplifier 12 shapes the waveform of the output of the counters 11d and 11e so that the predetermined width of signal is applied to the voice channel head. Said predetermined width of signal is preferably 2 milliseconds.

It should be noted that the counter 11d or 11e provides the time delay of $C_1 k + C_2$. And since two counters 11d and 11e are provided, two drop-outs within the length $L_1 + L_2$ can be detectable. Of course, when there are very few drop-outs in a magnetic tape, there is little possibility that there are two drop-outs in a short length, and so a single time counter is enough. In this case, the second time counter 11e and the switch 11j are omitted. On the contrary, when there are many drop-outs in a tape to be tested, perhaps more than three time counters will be necessary.

It is apparent to those skilled in the art that when a drop-out is detected on a video channel, the corresponding marker is recorded on a voice channel in the relationship shown in FIG. 2, by utilizing the apparatus shown in FIG. 4.

Figure 5:
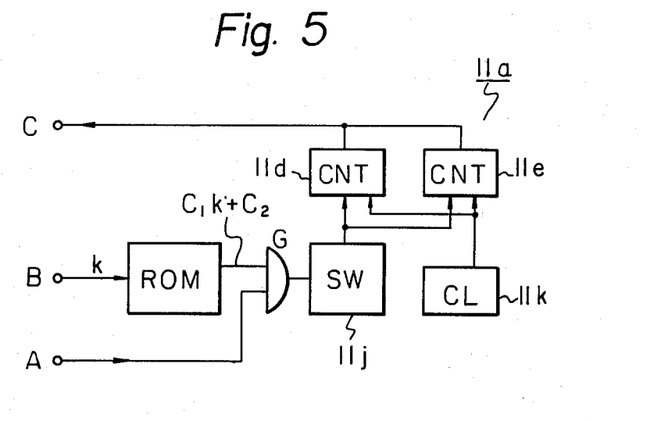
FIG. 5 is the modification of the delay calculator in FIG. 4.

FIG. 5 shows a modification 11a of the delay calculator. In the modification of FIG. 5, the read-only-memory (ROM) which stores the table for converting the value (k) to the value $C_1 k + C_2$ is the replacement of the dotted portion of the embodiment in FIG. 4. This is to say, the read-only-memory replaces the circuits consisting of the multiplier 11b, the adder 11c, the reference sources 11f and 11g the delay circuit 11m, and the AND circuits 11a and 11h. In FIG. 5, the value (k) is applied to the read-only-memory (ROM) as the address of the same, and the content of the address which is $C_1k+C_2$, is obtained from the read-only-memory. The output of the read-only-memory is applied to either the time counter 11d or 11e through the AND circuit (G) and the switch 11j. The counters 11d and 11e, the switch 11j and the clock pulse generator 11k operate similar to those in FIG. 4.

Figure 6:
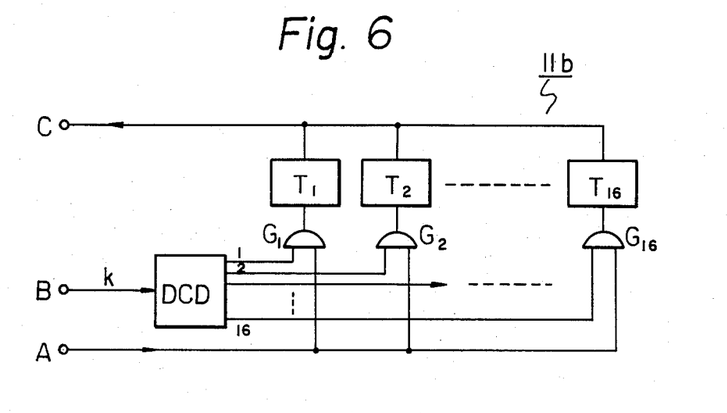
FIG. 6 is another modification of the delay calculator in FIG. 4.

FIG. 6 is another modification of the delay calculator 11b. In FIG. 6, a decoder (DCD) which provides one of 16 outputs according to the value (k), and sixteen timers $T_1$ through $T_{16}$ are provided. The timer $T_1$ provides the output signal when the time $C_1+C_2$ elapses that corresponds to $k=1$, the timer $T_2$ provides the output signal when the time $2C_1+C_2$ elapses that corresponds to $k=2$, et al. Thus, the timer $T_{16}$ provides the output signal when the time $16C_1+C_2$ elapses corresponding to $k=16$. The timers can be obtained on the commerical market, and for instance are implemented by the combination of a counter and a clock pulse generator, or an analog integrator. The timers are triggered through the AND circuits $G_1$ through $G_{16}$. This is to say, when $k=1$, the decoder provides the output signal on the first output line and the first AND circuit opens when the drop-out signal appears at the terminal (A), then the first timer $T_1$ is initiated, and when the time $C_1+C_2$ elapses, that timer $T_1$ provides the output signal which marks on the voice channel. Other times operate similarly.

The operation of the delay calculator 11 can also be performed by utilizing a programmed micro-computer. The flow-chart of the program in that case will be explained in accordance with FIG. 7.

Figure 7:
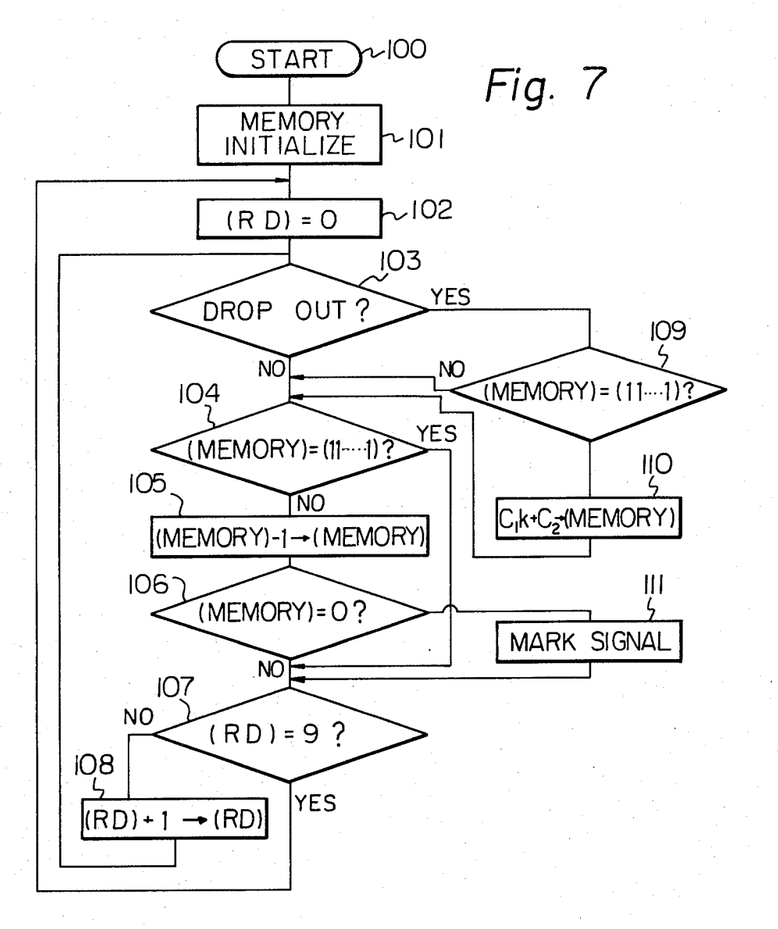
FIG. 7 is the flow-chart of a computer program which is the alternative of the delay calculator in FIG. 4.

In FIG. 7, it is assumed that there are ten memory areas (address 0 through address 9) for storing the value of $C_1k+C_2$, and each memory area has 16 bit positions. So, ten drop-outs within the range of $L_1+L_2$ are detectable. Also an address register (RD) for designating one of the memory areas is provided in the random access memory of the computer. The computer utilized in the experiment is TK80 type micro-computer manufactured by Nippon Electric Company Limited in Japan.

The operation of each box in the flow-chart in FIG. 7 is listed below.

(100) Start of the program.
(101) Said ten memory areas are initialized. In the initialized condition, each memory area has the information "1" in all bit positions.
(102) Address register (RD) is set to zero.
(103) Is there an drop-out signal ! The drop-out signal is provided from the drop-out detector 8 to the flag of the computer through the terminal (A) in FIG. 4.
(104) Is the content of the memory area designated by the address register (RD) "1" in all bit positions! The memory area operates as a time counter, and when all the bit position of the memory area has the information "1" , that memory area is not working as a time counter, and when the memory area has the particular content that memory area is operating as a time counter.
(105) The content of the memory are designated by the address register (RD) is substracted by one.

This operation corresponds to the subtraction of time counters 11d and 11e in FIG. 4.
(106) Is the content of the memory area designated by the address register (RD) zero!
(107) Is the content of the address register (RD) nine!
(108) The content of the address register (RD) is added by one.
(109) Is the content of the memory area designated by the address register (RD) "1" in all the bit positions! If all the bit positions of the memory area are "1", it means that the time counter is full, and the drop-out detected at that time is skipped.
(110) The calculation of the formula (2) is performed utilizing the value (k) at that time, and the result is stored in the memory area designated by the address register (RD).
(111) A marking signal for recording a voice channel is provided through the terminal (c) in FIG. 4 and the memory area is again initialized.

When there is no drop-out, the operation of the computer runs in the flow-chart as follows:
( 100–101–102–(103–104–107–108)–(103–104–107–108)–(103– The loop of (103–104–107–108) is repeated until the box 107 provides the output "yes". And when the box 107 provides "yes", the output of 107 is applied to 103 through 102, instead of 108.

When there is a drop-out signal and the box 103 provides the output "yes", then the output of 103 enters to the box 110 through 109. The output of 110 goes through 104, 105, 106 and 107, and the content of the memory area is subtracted by one. When the content of the memory area reaches zero after some repetition of the loop, the box 106 provides the output "yes", and the box 111 provides the marking signal to the voice channel head.

As decribed above, when it takes "$t_e$" to repeat the loop, the time counter embodied by the memory area of the computer is subtracted in every period of $t_e$. So by modifying the coefficients $C_1$ and $C_2$ in the formula (2), the computer can operate as a delay calculator in FIG. 4.

Also, it is apparent from the above explanation, that the program of the computer is very simple, and it takes only a few days to make the program for one person (including the coding and debugging) for those skilled in the art.

After the voice channel of the tape is marked, the tape is developed utilizing the reagent including ferromagnetic material, and the pattern as shown in FIG. 2 is obtained. On the developed pattern, a drop-out on a video channel stands on the perpendicular straight line which has the mark on the voice channel, so a drop-out can be recognized easily. The detected drop-out is analyzed and the result of the analysis is utilized for the improvement of the quality of a tape and the manufacturing process of the same.

As mentioned above, according to the present invention, a drop-out is detected utilizing an ordinary video tape recorder and some simple attachments. The analysis of a drop-out according to the present invention is useful for improving the tape quality and the manufacturing process of said tapes.

From the preceding it should now be apparent that a new and improved drop-out detecting system has been set forth. It should be understood of course that the embodiments disclosed are merely illustrative and are not intended to limit the scope of the invention. Reference should be made to the appended claims, therefore, rather than the specification as indicating the scope of the invention.

What is claimed is:

1. A drop-out detecting system of a magnetic tape for the use of a helical scan type video tape recording system comprising of;

tape running means having at least a pair of tape reels for taking off and winding up the tape, a helical scan head for reading the signal recorded magnetically on an oblique video channel relative to the moving direction of the tape to be tested, and a voice channel head positioned apart from said helical scan head along the path of said tape, a drop-out detector connected to the output of said helical scan head of the tape running means, said drop-out detector providing an output signal upon detecting the drop-out on the tape, means for generating a predetermined pulse train a drop-out position detector consisting of a counter, which is initiated by a head element switching signal for said helical scan head from said tape running means, and said counter being decremented or incremented by the predetermined pulse train for providing the position (k) of the drop-out on an oblique video channel, a delay calculator, responsive to the provided position, k, for providing a marking signal after the time $C_1k + C_2$, where $C_1$ and $C_2$ are velocity related constants, elapsed from the detection of the drop-out by said drop-out detector, and means for providing a marking signal to said voice channel head of said tape running means upon receipt of said marking signal from the delay calculator.

2. A drop-out detecting system according to claim 1, wherein said drop-out detector comprises of at least a comparator the reference input level of which is adjustable, and an integrator the time constant of which is adjustable.

3. A drop-out detecting system according to claim 1, wherein said delay calculator comprises of a multiplicator for providing the product $C_1k$, the adder for providing the sum $C_1k + C_2$, at least one time counter which is initialized by said sum and is decreased one by one by a predetermined clock pulse, and provides the marking signal for the voice channel head when the content reaches zero.

4. A drop-out detecting system according to claim 1, wherein said delay calculator comprises of a read-only-memory storing the table of (k) versus $C_1k + C_2$, and at least one time counter which is initialized by the output of the read-only-memory and is decreased one by one by a predetermined clock pulse, and provides the marking signal for the voice channel head when the content reaches zero.

5. A drop-out detecting system according to claim 1, wherein said delay calculator comprises of a decoder which provides an output signal on the particular output line according to the value (k), and a plurality of time counters each of which is triggered by the relating output of said decoder, and each of said time counters providing the marking signal for the voice channel head when the predetermined time depending upon each time counter elapses.

6. A drop-out detecting system according to claim 1, wherein said delay calculator is implemented by a programmed computer.

7. For use in conjunction with a helical scan type of video tape recorder for reading and/or writing signals on a moving magnetic tape having a transverse channel and a longitudinal channel, said video tape recorder having a helical scan head for reading and/or writing on said transverse channel and a voice channel head, advanced with respect to said helical scan head, for reading and/or writing on said longitudinal channel; an apparatus for detecting drop-outs on the transverse channel and recording a mark on the longitudinal channel corresponding to the longitudinal position on the tape of the drop-out, comprising:

drop-out detection means coupled to said helical scan head for detecting drop-outs on said transverse channel;

drop-out position detection means, responsive to the detected drop-outs and to the scan of said helical scan head for detecting the relative position of the drop-out with respect to a scan reference position on the transverse channel;

delay calculating means for calculating the time when the detected drop-out passes the voice channel head and for generating a marking signal at such time; and means for applying said marking signal to said voice channel head.

8. An apparatus as defined by claim 7 wherein said drop-out position detection means includes a counter for counting the time between the switching signal of said helical scan head and the occurrence of the drop-out.

* * * * *